March 2, 1937. J. E. G. EURICH 2,072,162
SPECIFIC GRAVITY INDICATING DEVICE
Filed April 24, 1935

INVENTOR
Joe E. G. Eurich
BY
ATTORNEY

Patented Mar. 2, 1937

2,072,162

UNITED STATES PATENT OFFICE 2,072,162

SPECIFIC GRAVITY INDICATING DEVICE

Joe Emil George Eurich, West Didsbury, Manchester, England, assignor to USL Battery Corporation, Niagara Falls, N. Y., a corporation of New York Application April 24, 1935, Serial No. 18,063
In Great Britain April 24, 1934

2 Claims. (Cl. 265—45)

This invention relates to a specific gravity indicating device for use more particularly in connection with electrical storage batteries where the case or container is composed of a transparent material such as glass, celluloid and the like, the device being adapted to be immersed in the electrolyte or liquid therein.

According to this invention, the improved device comprises a plurality of pivotally mounted members constituting arms or pointers each of a different predetermined specific gravity so that each member will indicate a certain predetermined specific gravity and therefore the state of charge according to the specific gravity range of the electrolyte or liquid from charge to discharge or vice versa.

In order that said invention may be clearly understood and readily carried into effect the same will now be described more fully, by way of example, with reference to the accompanying drawing, in which:—

Figure 1:
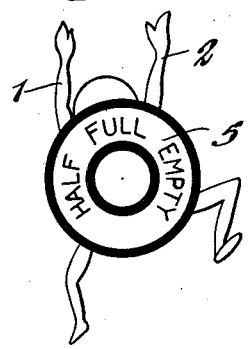
Figure 1 is a front view of a device embodying the invention.
Figure 2:
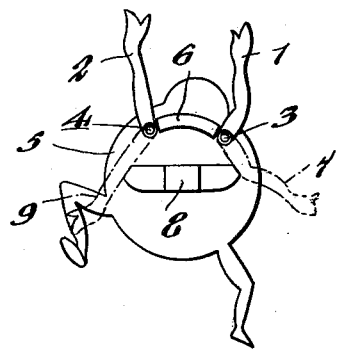
Figure 2 is a rear view thereof.
Figure 3:
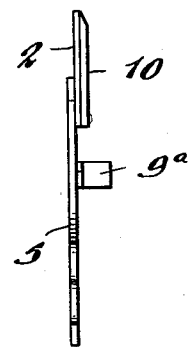
Figure 3 is a view taken at right angles to Figure 2.

Referring first more particularly to Figures 1, 2 and 3, of the drawing, 1 and 2 denote the arms or pointers, the said arms or pointers being pivotally connected at 3 and 4 to a suitably marked plate or disk 5, at the rear thereof, the arms or pointers being of elongated formation. The said plate or disk may be made of any suitable material of an insulating or acid-resisting character, such for example as, Bakelite, Ebonite, celluloid, or the like. The arms of pointers 1 and 2 are made of materials of different specific gravities and occupy the upright position shown in Figs. 1 and 2 when the state of the charge is "Full", the upward movement being limited by a stop 6 at the rear of the said plate or disk 5. When the state of charge is "Half", the arm or pointer 1 falls to occupy the position denoted by dot-and-dash lines at 7, Figure 2, the downward movement being limited by a stop 8 at the rear of the said plate or disk. When a state of discharge takes place, the arm or pointer 2 falls to occupy the position denoted by dot-and-dash lines at 9, Figure 2, to indicate the condition "Empty", the downward movement of this pointer being also limited by the stop 8. The stop 8 has associated therewith an extension or packing piece 9a adapted to assist in retaining the device in position within an electrical accumulator or cell, for instance, between the plates or active elements and one of the walls of the accumulator or cell.

It will be understood that the gravity at which the arms or pointers will fall will vary according to the type of accumulator or cell with which the device is employed. However, in practice, it is preferred to have the arms or pointers directed upwardly when the accumulator is fully charged, but one arm or pointer to be directed downwardly at half discharge, and both arms or pointers to be directed downwardly when the accumulator is fully discharged.

The material of which the arms or pointers are composed may be of varying specific gravities, such as, for instance, celluloid, Ebonite, or Bakelite, above referred to, or there may be employed layers of different materials, the resultant or average specific gravity of which is equal to the predetermined specific gravity at which each arm or pointer is to fall. For example, there may be employed a layer of celluloid, Ebonite, or Bakelite, to which a layer of wax or other appropriate material is applied, as by cementing or otherwise. In the example shown, see Figure 3, two layers of material are employed, the layer 10 being composed of wax or other appropriate material.

Figure 4:
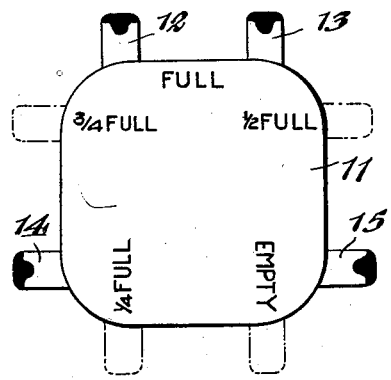
Figures 4, 5 and 6 are similar views to Figures 1, 2 and 3, but showing a modification.
Figure 6:
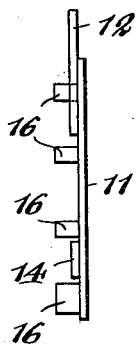
Figure 5:
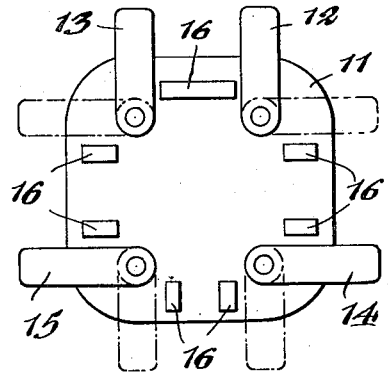

In a modification shown in Figures 4, 5 and 6, the device comprises a suitably marked plate 11 having pivotally connected thereto at the rear thereof elongated members 12, 13, 14, and 15 constituting arms or pointers, each being of a different predetermined specific gravity. The pointers 12 and 13, when directed upwardly, indicate "Full" charge, but when they fall they indicate "¾ Full" and "½ Full", respectively. When the arms 14 and 15 fall downwardly they indicate "¼ Full" and "Empty", respectively. Stops 16 at the rear of the plate 11 limit the extent of movement in either direction of the pivoted arms or pointers. In a similar manner, any number of arms or pointers could be employed to indicate any predetermined state of charge required by the use of arms or pointers of predetermined specific gravity equal to the specific gravity of the electrolyte or liquid at the state of charge which requires to be determined.

Having now particularly described and ascertained the nature of my said invention and in what manner the same is to be performed, I declare that what I claim is:—

1. A specific gravity indicating device comprising a disk bearing spaced indicia thereon corresponding to variations in gravity of the liquid to be tested, a plurality of pivotally mounted members associated with said disk, one member being provided for each indicium, the center of mass and the center of volume of each of said members coinciding, said members constituting arms or pointers each of a different predetermined specific gravity so that the several members move separately into registration with their respective indicium when and only when the existing gravity of the liquid corresponds to any particular member.

2. A specific gravity indicating device comprising a support adapted to be immersed in the electrolyte of a storage battery having a transparent container, a plurality of scales indicating variations in specific gravity of said electrolyte mounted on said support, a plurality of indicating members having substantially coincidental centers of volume and of gravity, and being of different predetermined specific gravities, pivotally mounted on said support and associated with said scales, one member being provided for each scale, said pivotally mounted members being adapted to be rotated separately about their pivots and in registration with their respective scales when the existing specific gravity of the liquid corresponds to the specific gravity of any particular member.

JOE EMIL GEORGE EURICH.